UNITED STATES PATENT OFFICE.

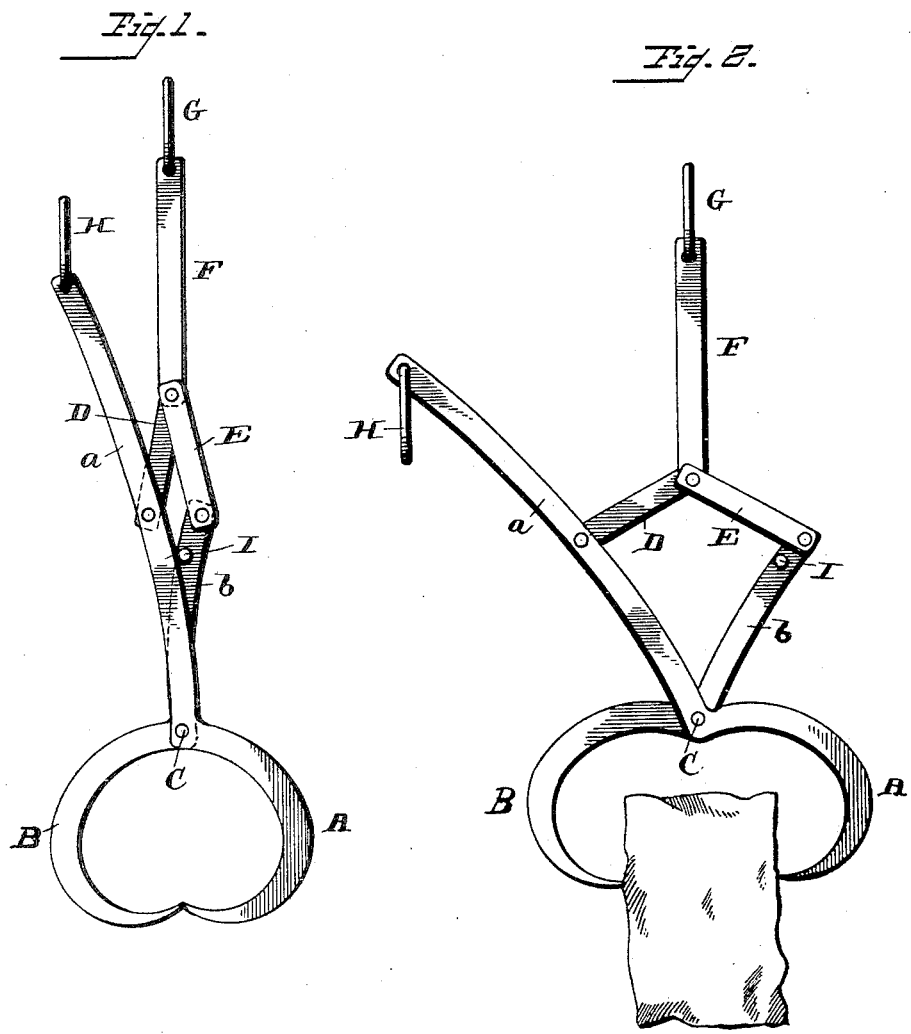

JESSE HICKS DUNGAN, OF HARRISVILLE, OHIO.

GRAPPLE.

SPECIFICATION forming part of Letters Patent No. 454,335, dated June 16, 1891.
Application filed February 26, 1891. Serial No. 383,003. (No model.)

*To all whom it may concern:*

Be it known that I, JESSE HICKS DUNGAN, a citizen of the United States, residing at Harrisville, in the county of Harrison and State of Ohio, have invented certain new and useful Improvements in Grapples; and I do hereby declare the following to be a full, clear, and exact description of the invention, such as will enable others skilled in the art to which it appertains to make and use the same.

This invention relates to grapples which are used in the handling of weighty irregular shapes and articles of commerce that are usually shifted and moved by mechanical contrivances.

The object of the invention is to lessen the task of the workman and facilitate the handling of merchandise, and at the same time render it possible for the workman to have one hand free and hold the commodity with as firm a grip as if both hands were employed.

The improvement consists of the novel features and the peculiar construction and combination of the parts, which will be hereinafter more fully described and claimed, and which are shown in the annexed drawings, in which—

Figure 1 is a front view of a grapple embodying my invention. Fig. 2 is a view similar to Fig. 1, showing the application of the invention.

The grapple-hooks A and B are pivoted together at C, and the lever $a$ of the grapple-hook A is about twice the length of the lever $b$ of the grapple-hook B, and the two levers $a$ and $b$ curve in opposite directions. The toggle-levers D and E connect the end of lever $b$ with the lever $a$ at a point about midway between its ends. The stem F, about half the length of the lever $a$, is pivotally connected with the inner ends of the toggle-levers D and E by the same bolt which connects the said levers D and E together. The stem and the lever $a$ are provided with suitable handles G and H, respectively. The stop I on the lever $b$ limits the downward movement of the toggle-levers and the inward movement of the grapple-hooks.

To open or separate the grapple-hooks A and B, the lever $a$ is held by one hand and the stem F is depressed by the other hand. To close the grapple-hooks on the parcel or package, the stem F is pulled upon simply and the package or parcel is carried by means of the said stem F.

It is essential to the operativeness and the efficiency of the implement that the levers of the grapple-hooks be connected by toggle-levers, whereby a down-thrust on the stem F through the said toggle-levers opens the grapple-hooks and a pull on the said stem closes the said grapple-hooks on the article to be lifted. That portion of the lever $a$ beyond the pivotal connection therewith of the toggle-lever D serves as a handle to facilitate the manipulation of the implement in efficient service. In the event of a hoisting-rope being applied to the stem F the extended portion of the lever $a$ will facilitate the adjustment of the grapple to the article to be elevated.

Having thus described my invention, what I claim, and desire to secure by Letters Patent, is—

1. A grapple composed of two grapple-hooks which are pivoted together and which have levers $a$ and $b$, toggle-levers D and E, connecting the levers $a$ and $b$, and a stem pivotally connected with the said toggle-levers, the lever $a$ being projected beyond the point of connection therewith of the toggle-lever D to form a handle, substantially as and for the purpose described.

2. The hereinbefore shown and described grapple, composed of the grapple-hooks A and B, which are pivoted together and which have levers $a$ and $b$, the toggle-levers D and E, connecting the levers $a$ and $b$, the lever $a$ being extended beyond the point of connection of the lever D therewith, the stem F, pivotally connected with the toggle-levers, the handles G and H, and the stop I to limit the downward movement of the toggle-levers and the inward movement of the levers $a$ and $b$, substantially as set forth.

In testimony whereof I affix my signature in presence of two witnesses.

JESSE HICKS DUNGAN.

Witnesses:
WILLIAM FISHER,
W. L. ANDERSON.